Sept. 23, 1958   N. N. MURRAY   2,853,263
CARBON DIOXIDE VALVE
Filed March 12, 1957
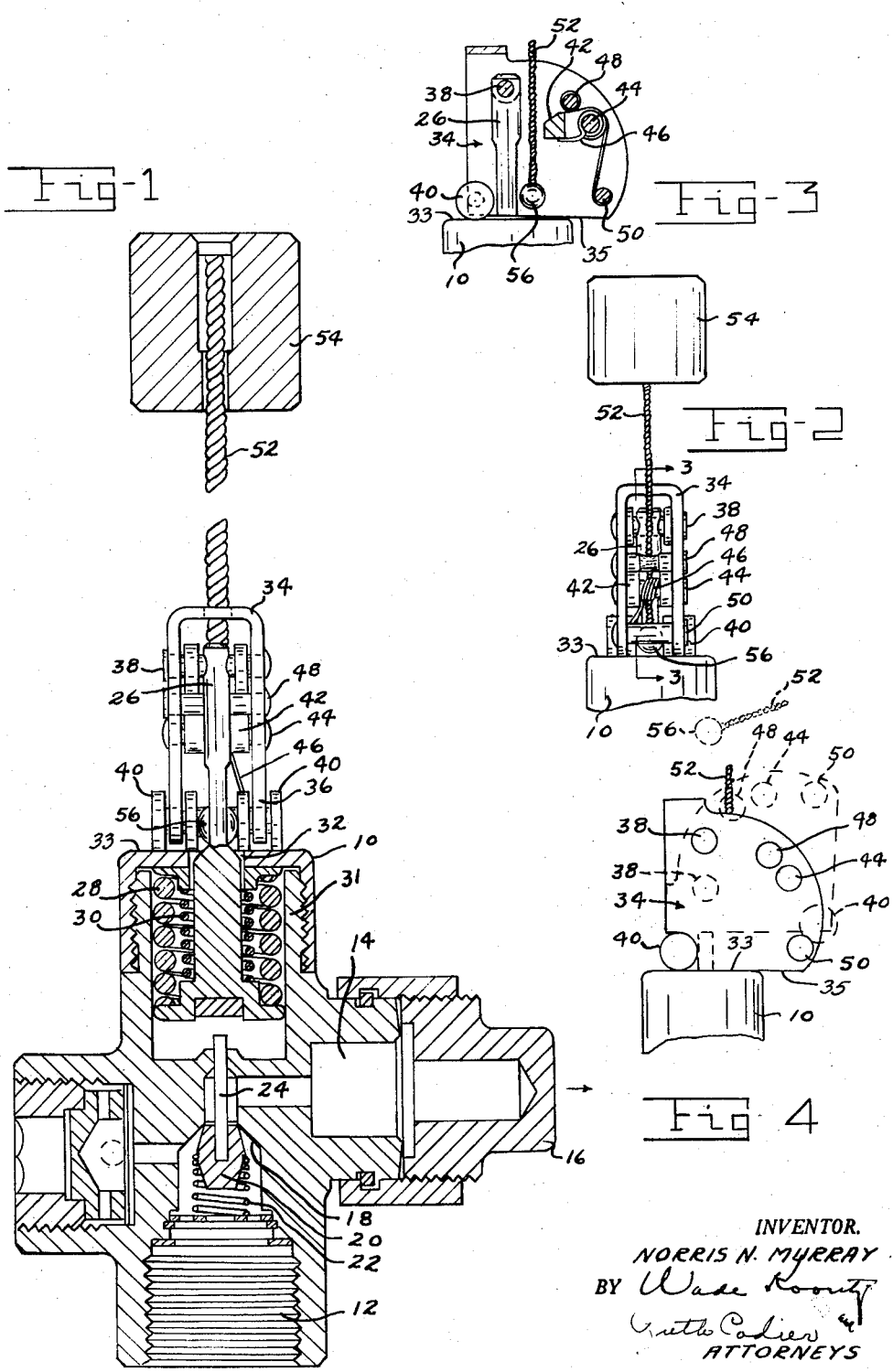
INVENTOR.
NORRIS N. MURRAY
BY
ATTORNEYS

United States Patent Office 2,853,263
Patented Sept. 23, 1958

2,853,263

CARBON DIOXIDE VALVE

Norris N. Murray, San Rafael, Calif., assignor to the United States of America as represented by the Secretary of the Air Force Application March 12, 1957, Serial No. 645,651

6 Claims. (Cl. 251—74)

(Granted under Title 35, U. S. Code (1952), sec. 266)

The invention described herein may be manufactured and used by or for the United States Government for governmental purposes without payment to me of any royalty thereon.

This invention relates to improvements in carbon dioxide cylinder valves and operating means therefor and, more particularly, to $CO_2$ cylinder valves for one-man life rafts.

The object of the invention is the provision of a valve and valve operating means attachable to an inflatable life raft for quick, positive and permanent opening thereof.

A further object of the invention is the production of a device operated by a lanyard, which is automatically separated from the device when the valve is opened, and can be attached to the device after a carbon dioxide cylinder has been filled with gas.

A still further object of the construction lies in the fact that the cylinder may be filled with gas and the valve closed to permit weighing of the cylinder and valve attachment before the lanyard is attached so that leakage is detectable and more accurate weighing is obtained.

Another object of the invention is the production of a device, which can be included in emergency equipment for flyers during emergency flights over water, and one wherein the valve may be opened by a parachutist as he descends so that his life raft is available for his use when he reaches ocean surface.

A further object of the invention is the provision of a valve operating device which is quick, positive and permanent in its action, and will remain closed until a predetermined amount of pull has been applied.

Other objects and advantages will become apparent as the description proceeds.

In the drawings,

Fig. 1 is a vertical cross section showing the valve operating mechanism in elevation and from the rear.

Fig. 2 is a front elevational view of a valve operating mechanism.

Fig. 3 is a sectional view taken on the line 3—3 of Fig. 2.

Fig. 4 is a side elevation showing the position of the valve operating means after the valve has been opened.

Referring more in detail to the drawings, a main valve body or casing 10 is made of cast brass or other suitable material. It is made in one piece as shown and forms a housing for the internal parts of the valve later described. The inlet shank 12 is internally screw-threaded for attachment to a carbon dioxide cylinder (not shown). During the filling of the $CO_2$ cylinder, the boss 14 is attached to a source supply of carbon dioxide. The boss 14 is subsequently attached to an inflatable life raft, not shown. During periods of nonuse this boss is stoppered by a plug 16. The valve body or housing is provided with a valve seat 18 and a check valve 20. A spring 22 biases the valve 20 to closed position and meters the $CO_2$ as it flows from source to cylinder. The valve 20 is provided with a valve stem 24 which is positively engageable by a plunger 26. Plunger 26 is spring loaded by a pair of springs 28 and 30 contained in the extended portion 31 of the valve body 10. The springs 28 and 30 bias the plunger downwardly to contact the valve stem 24. The springs 28 and 30 are of different resonance periods to prevent reverse bounce. The plunger extends through an opening 32 in the valve body 10 and is held out of contact with the valve stem by means as follows:

A hood member 34 is of U-shape and is provided with a pair of fan-shaped parallel faces or plates 36; each plate has a pair of normally extending edges, the edges 35 being seated, when the valve is closed, and the valve operating means is held suspended, on a flat area 33, located at the top outside surface of the valve casing 10; the plunger 26 is pivoted to the hood by a pivot pin 38; the hood member 34 is also provided with roller members 40, which are adapted to roll along the top flat surface area 33 of the valve body 10. The pivot point 38 constitutes the point of support of the plunger, and lies between the roller member 30 and the supporting contact surface 33 and very nearly at a dead center. When the hood, operated by means later to be described, moves from the position shown in Figs. 1, 2 and 3, to the position shown in dotted lines in Fig. 4, the rollers 40 are carried under the pivot 38 and past the point of dead center. When this happens, the plunger 26 is no longer supported. The force of the compressed springs 28 and 30 takes over. The plunger is dropped and impinges upon the valve stem 24 to open the valve 20.

The means for changing the position of the hood as just described will now be explained. A lever or stop or trigger element 42 is pivoted at 44 and is held in the position shown in Fig. 3 by the torsion spring 46 and a limit pin 48. A pin 50 provides an anchor and retaining means for the end of the torsion spring 46. An operating lanyard 52 is provided with a hand grip 54 and at its opposite end with a ball 56.

During the filling, weighing and testing of the cylinder and valve device the lanyard is free and separate. After these operations have been completed the ball 56 is forced past the stop 42, the spring 46 allowing sufficient movement of the stop for the ball to pass. Thereafter the ball 56 is held captive behind the stop. When the parachutist or other operator desires to inflate the life raft, he applies a pull in the order of 20 pounds to the lanyard. When this occurs, the ball 56 contacts the underside of the stop or trigger 42 and forces the hood to begin pivoting about the pivot point 38. This movement is aided by the rollers 40 which roll along the upper surface of the valve casing, the hood assuming the position shown in phantom in Fig. 4. The ball 56 with its attached lanyard is freed. The plunger, meanwhile freed from the restraint imposed by the hood, is forced downward by the springs 28 and 30 into contact with the valve stem 24, holding it open for the inflation of the raft. It will be seen that the valve is held permanently in open position until special tools are employed for resetting the device.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. A valve operating device for gas cylinder valves wherein a valve stem and valve head are contained in a valve casing, a spring loaded actuating plunger extending through the valve casing for contacting the valve stem and unseating the valve head, means for restraining said plunger to a position out of contact with the valve stem, said means comprising a movable hood member pivoted to said plunger externally of the valve casing, a roller on said hood for supporting said hood when in plunger restraining position and augmenting a change of position of said hood, means for releasing said restraining means comprising a spring biased stop element pivoted in said hood, a ball attached to a lanyard and insertable past said spring biased stop element, said ball operating to move said hood to release the restraint on said plunger when a predetermined pulling force is applied to said lanyard.

2. A valve operating device and restraining means therefor comprising a hood positioned externally of a valve casing and in contacting and cooperating relationship with and movable with reference thereto, said hood having pivotal connection with a valve operating spring loaded plunger, said hood being adapted for setting in a position wherein said plunger is restrained from valve operating position, trigger means for moving said hood to a nonrestraining position, said means comprising a lanyard, a ball attached to said lanyard, a spring loaded stop, said ball being insertable behind said stop to be held captive until a predetermined pull is applied to said lanyard, said hood being moved to a nonrestraining position when sufficient force is applied to free said ball and lanyard.

3. A valve operating device wherein a valve and valve stem are enclosed in a valve casing, said valve operating device comprising a plunger for contacting the valve stem and permanently opening the valve, means for biasing said plunger to valve opening position, means for setting and restraining said plunger in position against the force of said biasing means and out of contact with the valve stem, thereby maintaining the valve in closed position, said last named means comprising a hood, means for effecting pivotal connection between said hood and said plunger, a roller on said hood, said roller constituting a point of support for said hood when said plunger is in position out of contact with the valve stem, means for rocking said hood and moving said roller out of hood supporting position thereby releasing said plunger to cause permanent opening of the valve.

4. A device for permanently opening a valve wherein a valve stem and valve head are enclosed in a valve casing, and wherein the valve head is normally biased to closed position, said valve opening device comprising a plunger for impinging upon the valve stem for permanently opening the valve, means for biasing said plunger to open the valve, means for setting and restraining said plunger in position against the force of said biasing means and out of contact with the valve stem, thereby maintaining the valve in closed position, said last named means comprising a hood, means for effecting pivotal connection between said hood and said plunger, a roller on said hood, said roller constituting a point of support for said hood when said plunger is in restrained position out of contact with the valve stem, means for rocking said hood and moving said roller out of hood supporting position thereby releasing said plunger to cause permanent opening of the valve, said last named means comprising a spring pressed trigger pivoted in said hood, a ball secured to a lanyard and insertable behind said trigger for operating said trigger to rock said hood and release said plunger from restrained position when a predetermined force is exerted on said lanyard.

5. A device for permanently opening a valve wherein a valve stem operates within a valve casing, said device comprising a plunger extending through an opening in said casing and adapted for impinging contact with the stem of the valve to open the valve, a plurality of springs of different phase resonance housed within said valve casing for biasing said plunger to impinging contact with the valve stem to open the valve, means for anchoring said plunger against the bias of said springs to hold said plunger out of contact with the said valve stem, said means comprising a hood, a pivot connection between said hood and plunger externally of said valve casing, rollers on said hood, said casing providing a support for said rollers and a supporting contact for a portion of said hood, said pivot connection being located between the point of roller support and the point of hood contact when said plunger is in restrained position, means for rocking said hood to roll said rollers beyond dead center to release the restraint on said plunger and return it to the bias of said springs.

6. A device for permanently opening a valve wherein a valve stem is positioned in a valve casing, and wherein the valve is normally biased to closed position, said valve opening device comprising a plunger extending through an opening in said casing and adapted for impinging contact with the stem of the valve to open the valve, a plurality of springs of different phase resonance housed within said valve casing for biasing said plunger to valve stem contact, means for anchoring said plunger against the bias of said springs to hold said plunger out of contact with the valve stem, said means comprising a hood, a pivot connection between said hood and plunger externally of said valve casing, rollers on said hood, said casing providing a support for said rollers and a supporting contact for a portion of said hood, said pivot connection being located between the point of roller support and the point of hood contact when said plunger is in restrained position, means for rocking said hood to roll said rollers beyond dead center to release the restraint on said plunger and return it to the bias of said springs, said last named means comprising a pivot pin in said hood, a spring pressed latch pivoted to said pin, a free lanyard, a ball on said lanyard capable of being inserted in said hood and being restrained by said latch, said ball operating to rock said hood about said last named pivot to remove the support afforded said plunger by said roller and the contact between said casing and hood.

References Cited in the file of this patent

UNITED STATES PATENTS

| | | |
|---|---|---|
| 1,113,314 | Dale | Oct. 13, 1914 |
| 2,568,308 | Wells | July 21, 1947 |
| 2,630,018 | Hannant | Mar. 3, 1953 |

Disclaimer 2,853,263.—*Norris N. Murray*, San Rafael, Calif. CARBON DIOXIDE VALVE. Patent dated Sept. 23, 1958. Disclaimer filed Mar. 7, 1963, by the assignee, *United States of America as represented by the Secretary of the Air Force.*

Hereby enters this disclaimer to claims 1, 2, 3, 4, 5 and 6 of said patent.
[*Official Gazette May 7, 1963.*]